May 8, 1945.    M. J. O. LOBELLE    2,375,423
AIRCRAFT
Filed Jan. 23, 1943    4 Sheets-Sheet 4
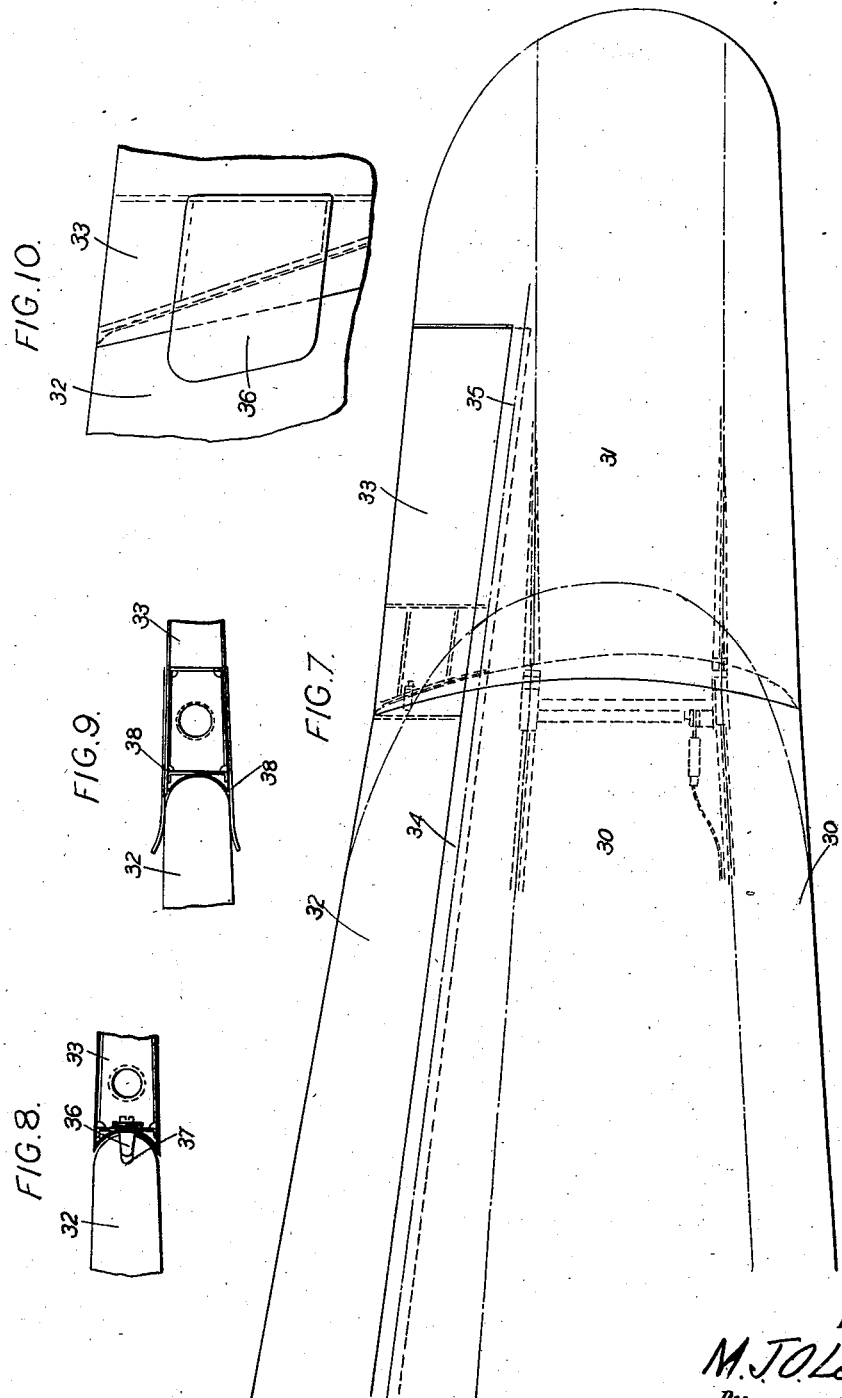

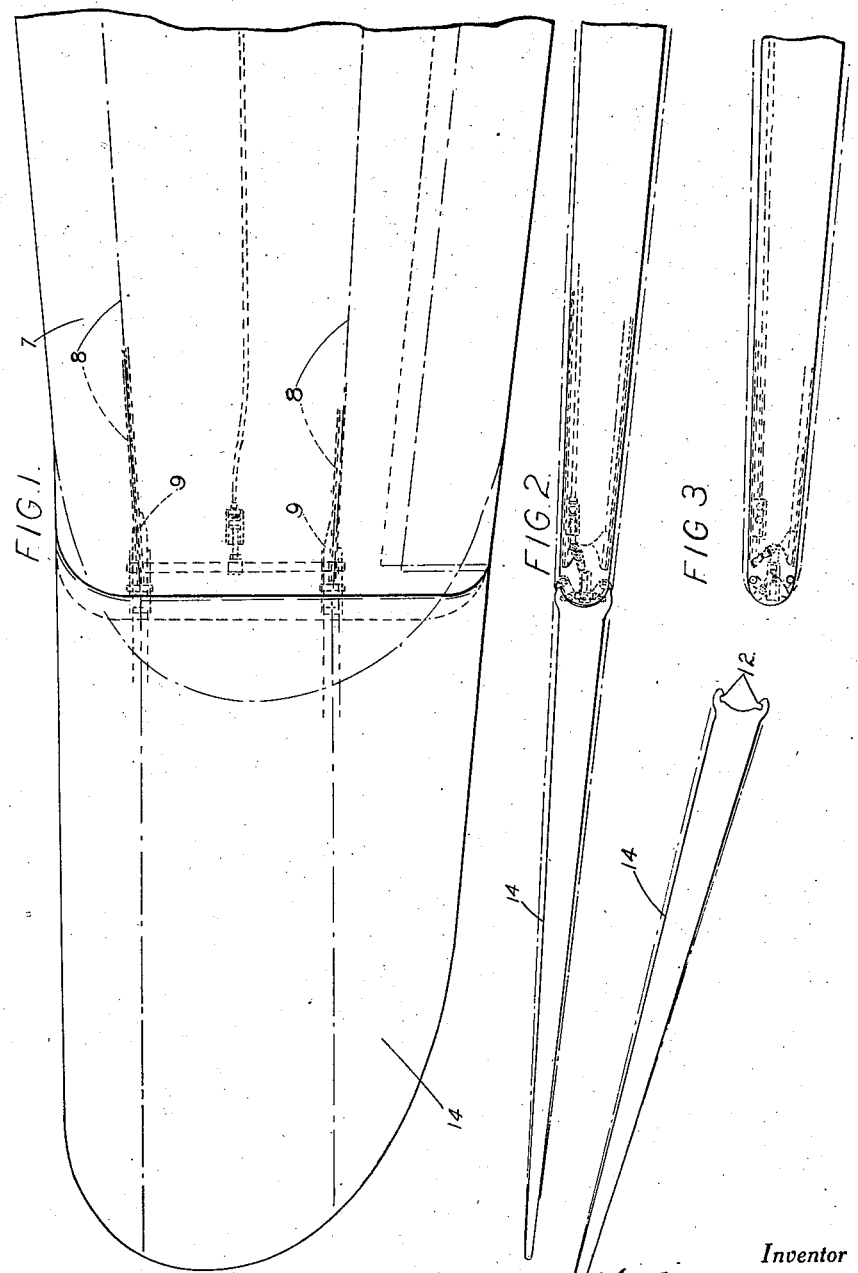

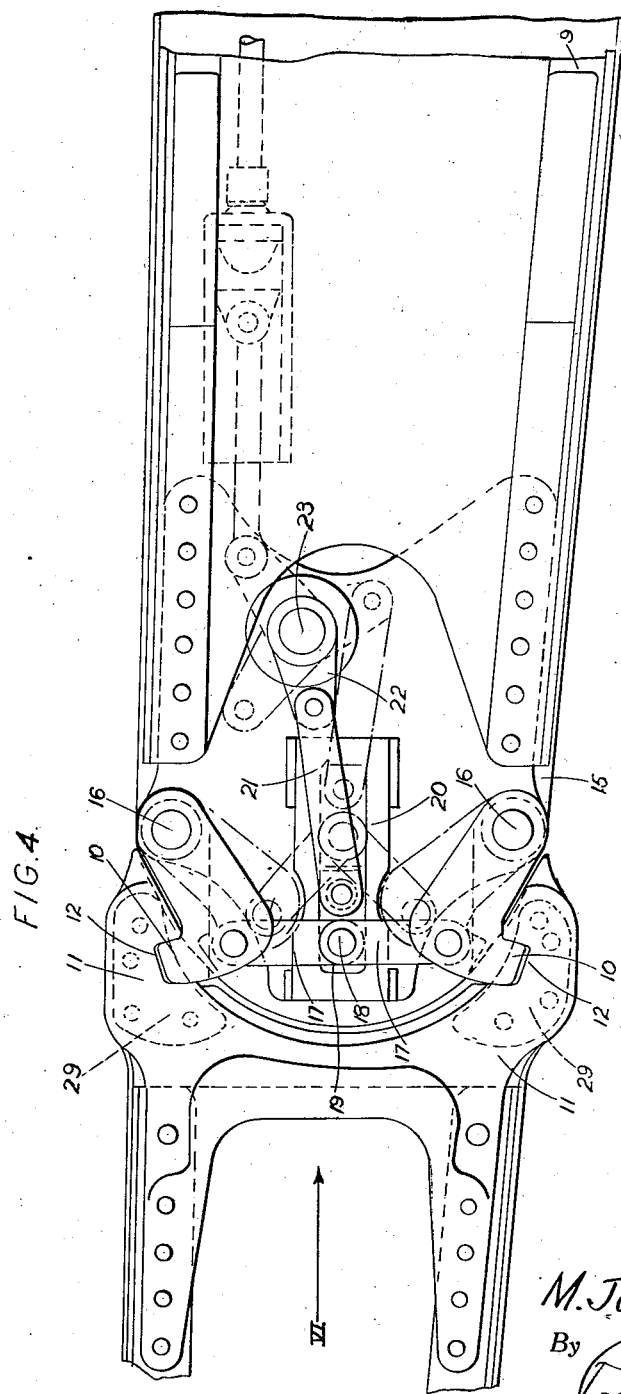

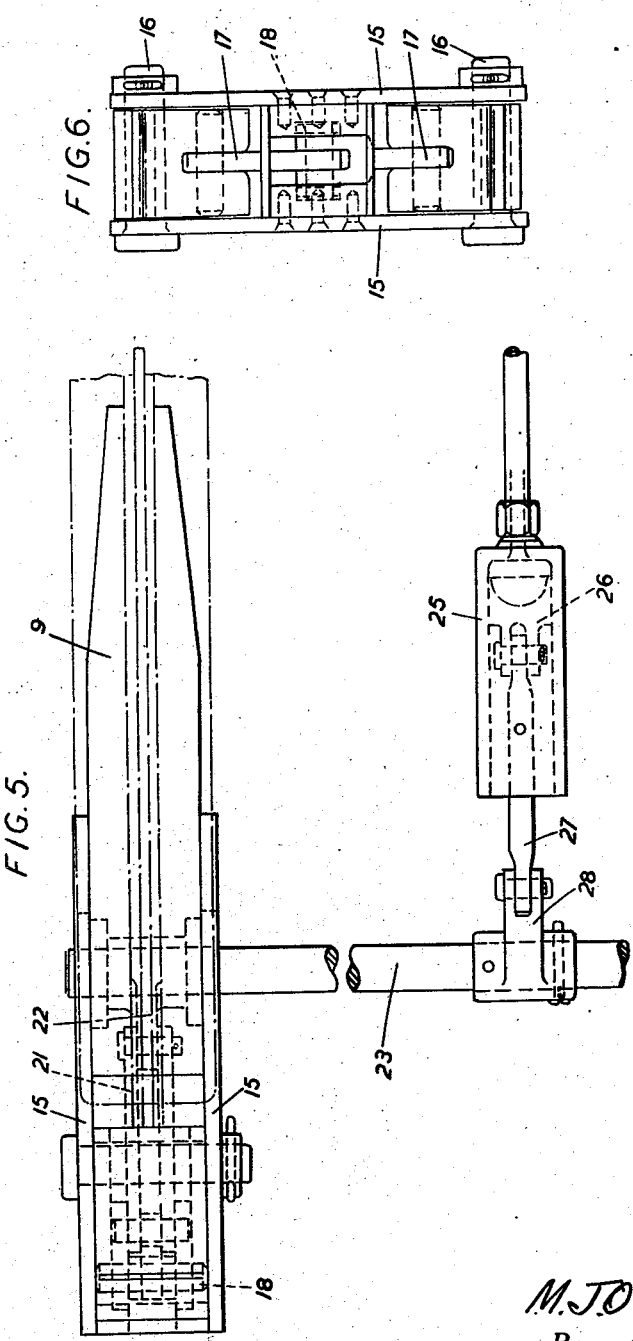

Patented May 8, 1945

2,375,423

UNITED STATES PATENT OFFICE 2,375,423

AIRCRAFT

Marcel Jules Odilon Lobelle, Slough, England, assignor to R. Malcolm Limited, Slough, England, a British company Application January 23, 1943, Serial No. 473,367
In Great Britain February 2, 1942

6 Claims. (Cl. 244—43)

This invention relates to aircraft and it has for its object to provide the wings with detachable portions which can be used to increase the lift for taking-off or for steady flight, but can be dropped and discarded with safety at any time while the aircraft is air-borne. According to the invention, each wing of the aircraft is provided with a detachable tip secured to the end of the wing by releasable hook attachments, and provision is made for effecting the release with certainty at any time under the control of the pilot.

If the wing has two spars, the releasable hook attachments are provided on the ends of the spars, and the spars themselves are strengthened if necessary to carry the additional load.

The ailerons of the main wings can be continued into the wing tips if releasable connections are provided which will permit the parts of the ailerons secured to the wing tips to come away freely from the ends of the main wing ailerons when the tips are released. Such an arrangement has the advantage that the lateral control of the aircraft in flight while the wing tips are in use can be rendered more effective.

The addition of the further lifting area at the wing tips is highly desirable, as compared with any possible increase in the breadth of the wings, for example, by the provision of extensible flaps and the like, because the added tips increase the aspect ratio and improve the lifting power of the existing normal wing area, besides adding substantially to the total lifting area available. Each tip may add many square feet, say fifteen square feet, of lifting area which may very largely increase the loading capacity of the aircraft.

The invention is illustrated by way of example in the accompanying drawings in which:

Figure 1 shows the end portion of an aeroplane wing in plane view, with the detachable tip attached thereto;

Figure 2 is a front view of the wing and tip;

Figure 3 is a similar view showing the tip released;

Figure 4 is an enlarged view of the releasing hook mechanism applied to the end of a spar, and the engaged portion of the wing tip, as seen from the front in Figure 2, with the front plate on the spar removed;

Figure 5 is a plan view of the releasing hook mechanism in the wing; and

Figure 6 is a face view of the releasing hook mechanism viewed in the direction of the arrow VI in Figure 4;

Figure 7 is a plan view of a wing and wing tip with interconnected ailerons;

Figure 8 is an enlarged sectional view showing a pin and socket connection between the parts of the aileron; and Figures 9 and 10 are a sectional view and partial plan view showing an alternative form of connection.

In carrying the invention into effect as applied to a type of aircraft having two spars in each wing, as in Figure 1, the end of the wing 7 is preferably shaped to a substantially straight form with rounded corners as shown, and the ends of the spars 8 have packing pieces 9 applied thereto if necessary to bring them up at right angles to the straight ends of the wings. The spars have strengthening strips applied to them, at least in the outer part of their length if the tips are being added to a machine of existing design, because the added wing tips will materially add to the load on the spars. Each spar is then provided at its end with a locking device which in this case is a double-hook coupling, the jaws 10 of the hooks being adapted to be expanded when in use to engage in recesses at 12 in plates forming part of a steel fitting piece 11 attached to the inner end of the added wing tip 14. The wing tip 14 may be of any suitable construction such as a skeleton metal or wooden frame with a metal or canvas covering, and the fitting piece 11 is of steel, shaped as shown to fit upon the end of the wing 7 of the aircraft. The end of the wing 7 is rounded or chamfered in cross section to enable the fitting piece 11 to embrace it, and to enable the hooks 10 to project through it above and below.

A convenient construction for the hook members is as follows: Side plates 15 are fitted to packing pieces 9 at the end of each spar 8 to project beyond it into the end of the wing, and between these plates near the top and bottom thereof are mounted spindles 16 each carrying one of the hooks 10. These hooks 10 are substantial steel members with ends projecting outwardly, and adapted to be expanded into engagement with the sockets in the steel fitting piece on the wing tip. The bends of the hook members 10 are connected by links 17 adapted to form a toggle, the joint between the links being made by a spindle 18 whose ends engage in slide blocks 19 working in slots or grooves in guides 20 fixed to the plates 15. For expanding and releasing the toggle a link 21 is provided connected to a crank 22 on a cross shaft 23 extending across from one spar to the other at the end of the wing. The crank 22 can be set so that it and its link 21 themselves form a second toggle, the crank and link being in line or just past a line through the crank shaft 23 and the spindle 18 of the first toggle when it is fully extended. In this way, the force required to effect release of the hooks can be made very small.

The crankshaft may be operated in any desired manner, either directly from the cabin, or through pneumatic, hydraulic or other transmission. If a fluid pressure transmission is used as shown, a cylinder 25 is provided in each wing operating by its piston 26 through a link 27 on a crank 28 on the crankshaft 23. The fluid under pressure is controlled by a cock or the like (not shown) in the pilot's cabin, and it acts simultaneously to release both wing tips instantaneously when required. Of course any other form of control such as a cable control could be used, the arrangement being such that the release is simultaneous. Side pieces 29 are provided on the steel fittings 11 to engage with the sides of the hooks 10 to take the fore-and-aft thrust on the wing tips 14, or each tip 14 may have one or more projections engaging recesses in the end of the wing 7 to serve a similar purpose. The hooks 10 hold the steel fitting pieces 11 tightly against the ends of the wings and take any load upwards or downwards on the tips, and also the load due to air pressure tending to cause the wing tips to cant about one pair of hooks in relation to the other pair in a horizontal plane. The side pieces 29 are only needed to oppose any tendency for the wing tips to be pushed back with a sliding movement along the ends of the wings.

The term "hook" has been used for convenience of description because pivoted locking members are preferred, but effectively the engaging elements are equivalent to bolts, and any freely acting members serving the function of bolts can be used. The slide blocks 19 working in the guides 20 prevent the toggle members 17 from going too far beyond their centre-line positions so that the force required for release may be kept very small, although there is no risk that release can occur unintentionally as the toggles 17 must first be pulled past their centre line positions in any case.

The arrangement of the hooks in the ends of the main wings can be varied and any number of such releasable connections can be provided depending upon the size of the wings and wing tips.

Referring to Figures 7 and 8, a wing 30 is shown with a tip 31 detachably secured on its end, and the aileron 32 of the main wing 30 is continued by the part of the aileron 33 in the tip. The hinge line of the main aileron 32 is indicated at 34, and that of the detachable part 33 is indicated at 35. The part 33 carries a projecting pin 36 with a rounded end which engages in a socket at 37 in the end of the part 32 providing a positive connection between the two parts for their simultaneous control so long as the wing tip is attached to the main wing. When the wing tip 33 is released, however, the pin 36 comes out from its socket 37 allowing the wing tip 31 and its aileron 33 to fall away. The aileron 32 then continues to function in association with the main wing 30.

Instead of a pin and socket connection any suitable alternative may be used to unite the parts of the ailerons operatively while the wing tips are in use. For example, Figures 9 and 10 show plates 38 attached to the aileron 33 above and below and extending over the end of the main aileron 32, the free ends of the plates 38 being curved outwardly to facilitate the disengagement when required.

By the use of the detachable wing tips according to the invention, aircraft can be got off the ground or launched from ships with a substantially increased load, and they can either fly to far greater distances or remain in the air for many hours longer as may be required because the aircraft can carry a substantially increased fuel supply. The aircraft can continue to fly with the tips 14 or 31 in use as long as is useful, but the tips can be released and discarded at any time when maximum speed or manœuvring power is required. Normally the aircraft will not be required to manœuvre suddenly in taking off so that a less factor of safety in wing loading will be sufficient at take-off, increasing the permissible initial loading of the aircraft at this stage.

I claim:

1. The combination with the main wing of an aircraft formed with at least two longitudinal spars, of pairs of hook members mounted upon the ends of such spars, the hook members of each pair being mounted with their ends extending upwardly and downwardly respectively, operating mechanism for said hook members including toggle linkage adapted to hold said hook members in the extended position, a separate wing tip shaped at its inner end to fit upon the end of said main aircraft wing and having recesses adapted to be engaged by said hook members.

2. The combination with the main wing of an aircraft formed with at least two longitudinal spars, of pairs of hook members mounted upon the ends of such spars, the hook members of each pair being mounted with their ends extending upwardly and downwardly respectively, operating mechanism for said hook members including toggle linkage adapted to hold said hook members in the extended position, a separate wing tip shaped at its inner end to fit upon the end of said main aircraft wing and having recesses adapted to be engaged by said hook members, an aileron hingedly mounted at the rear edge of said main wing, an extension of such aileron hingedly mounted at the rear edge of said wing tip, and a releasable connection between said aileron and the extension thereof carried by the wing tip.

3. The combination with the main wing of an aircraft of at least two pairs of locking members mounted at the end of said main wing, a detachable wing tip shaped at its inner end to fit upon the end of said main wing and having recesses adapted to be engaged by said pairs of locking members for uniting said wing tip with the main wing, an aileron hingedly mounted at the rear edge of said main wing, a continuation of said aileron hingedly mounted at the rear edge of said wing tip, and detachable means of engagement between said aileron and its continuation in the wing tip adapted to insure simultaneous operation of the aileron and its continuation in the wing tip so long as the wing tip is attached to said main wing.

4. The combination of main aircraft wing and wing tip claimed in claim 6, wherein the detachable means of engagement between the aileron on the main wing and its continuation on the wing tip comprises a pin with a rounded end secured to the rear end of the said aileron continuation, and a socket in the end of the aileron on the main wing, the shape of said pin and socket being such as to permit free disengagement when the wing tip is released.

5. The combination with the main wing of an aircraft of at least two pairs of retractable locking members mounted at its end, toggle linkage adapted when extended to hold said locking members extended and when contracted to retract said locking members, a crank shaft in said wing and means for turning it for extending or contracting said toggle linkage and for extending or retracting said locking members, a detachable wing tip shaped at its inner end to fit on the end of said main wing and provided with recesses for engagement by said retractable locking members.

6. The combination with the main wing of an aircraft of at least two pairs of retractable locking members mounted at its end, toggle linkage adapted when extended to hold said locking members extended and when contracted to retract said locking members, a crank shaft in said wing and means for turning it for extending or contracting said toggle linkage and for extending or retracting said locking members, a detachable wing tip shaped at its inner end to fit on the end of said main wing and provided with recesses for engagement by said retractable locking members, and side pieces attached to the inner end of said wing tip in positions adjacent said recesses in which said locking members engage adapted to coact with said locking members to prevent rearward sliding movement of said wing tip upon the end of the main wing while said locking members are in engagement with the recesses in the wing tip.

MARCEL JULES ODILON LOBELLE.